United States Patent [19]
Henson

[11] Patent Number: 5,746,252
[45] Date of Patent: May 5, 1998

[54] THREE-WAY HOT AIR DIVERT VALVE

[76] Inventor: Dale Henson, 3350 Scott Blvd., Suite 3801, Santa Clara, Calif. 95054

[21] Appl. No.: 799,965

[22] Filed: Feb. 14, 1997

[51] Int. Cl.$^6$ ................................................ F16K 11/085
[52] U.S. Cl. ................................ 137/625.47; 137/375
[58] Field of Search ............................ 137/625.47, 375

[56] References Cited

U.S. PATENT DOCUMENTS 4,079,747  3/1978  Roberts ............................. 137/375
4,681,133  7/1987  Weston ........................ 137/625.47 X
4,932,432  6/1990  Berclem ............................. 137/325

Primary Examiner—John Fox
Attorney, Agent, or Firm—The Kline Law Firm

[57] ABSTRACT

A three-way hot air divert valve. The valve is mechanically similar to a normal divert valve, but includes elements made from refractory materials to provide thermal breaks so that heat in the hot air line does not adversely affect the moving parts of the valve. The refractory material will generally be a ceramic. The user chooses the particular setup of the valve, so that he can choose the direction of air flow to a waste air area.

6 Claims, 3 Drawing Sheets

THREE-WAY HOT AIR DIVERT VALVE

FIELD OF THE INVENTION

The present invention relates generally to a valve for directing air flow, and more particularly is a three-way divert valve that can handle extremely high temperatures

BACKGROUND OF THE INVENTION

Many manufacturing processes, e.g. extrusion operations, thermoplastic processing, and heat shrink operations, require a supply of heated air. The temperature required can exceed 1,000° F. Clearly, special heat-resistant materials are required for the transport and routing of air at such high temperatures.

Current art hot air supplies simply have a means to turn off the flow of hot air when a temporary stoppage is necessary, or the entire air supply mechanism is moved away from the workpiece. There is no means to stop the flow of hot air to the workpiece without completely stopping the flow of hot air.

The shortcoming of these solutions to the problems of diverting hot air is that the process must be restarted after every diversion of the hot air flow. Restarting a hot air process demands that the air flow be redirected and recalibrated, with the process then being stabilized with the new setup.

OBJECTS, SUMMARY, AND ADVANTAGES OF THE INVENTION

Accordingly, it is an object of the present invention to provide a means of diverting a hot air supply without disturbing a process setup.

It is a further object of the present invention to provide such a means that can be actuated automatically or manually.

It is a still further object of the present invention to provide a valve that diverts hot air to a waste area, rather than having to shut the air flow off.

In summary, the present invention is a three-way hot air divert valve. The valve is mechanically similar to a normal divert valve, but includes a housing jacket made from a refractory material to provide a thermal break. The refractory material will generally be a ceramic or mineral mix. The user chooses the particular setup of the valve, so that he can choose the direction of air flow to a waste air area.

An advantage of the present invention is that hot air processes need no longer be recalibrated after even the most minor of stoppages.

Another advantage of the present invention is that the valve can be installed with either manual or automated control mechanisms.

These and other objects and advantages of the present invention will become apparent to those skilled in the art in view of the description of the best presently known mode of carrying out the invention as described herein and as illustrated in the drawings.

BEST MODE OF CARRYING OUT THE INVENTION

Figure 1:
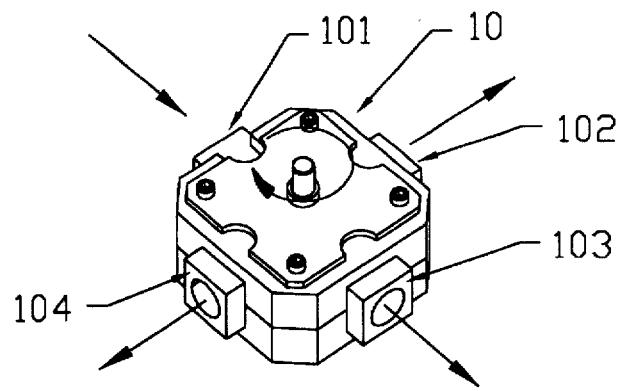
FIG. 1 is a 3-D view of the assembled three-way hot air divert valve of the present invention.
Figure 2:
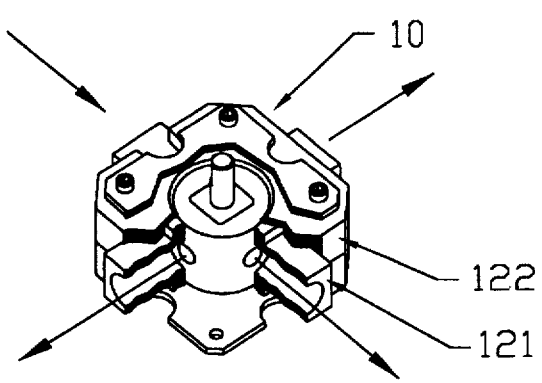
FIG. 2 is a partially broken view of the assembled three-way hot air divert valve.

The present invention is a three-way hot air divert valve 10. Referring first to FIGS. 1 and 2, it can be seen that the three-way hot air divert valve 10 includes an inlet 101 and three outlets 102, 103, & 104.

Figure 3:
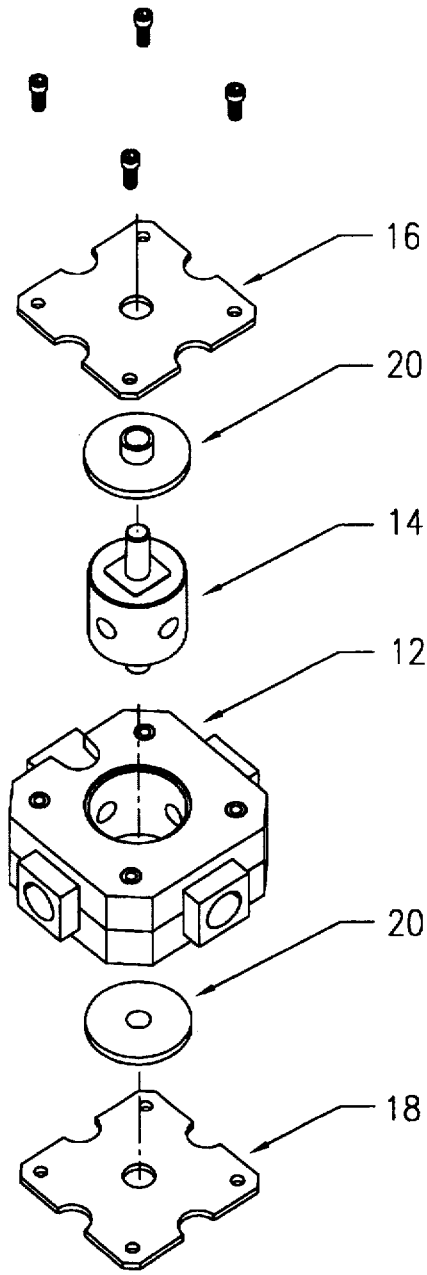
FIG. 3 is an exploded view of the three-way hot air divert valve.

Referring now to FIG. 3, the chief components comprising the three-way hot air divert valve 10 are a housing assembly 12 and a valve core assembly 14. The valve core assembly 14 is rotatably fixed in place by an upper mount plate 16 and a lower mount plate 18. Upper and lower bushings 20 facilitate rotation of the valve core assembly 14 within the housing assembly 12. The bushings 20 are non-metallic so that they can insulate the valve core assembly 14 from contact with the upper and lower plates 16 & 18.

Figure 4B:
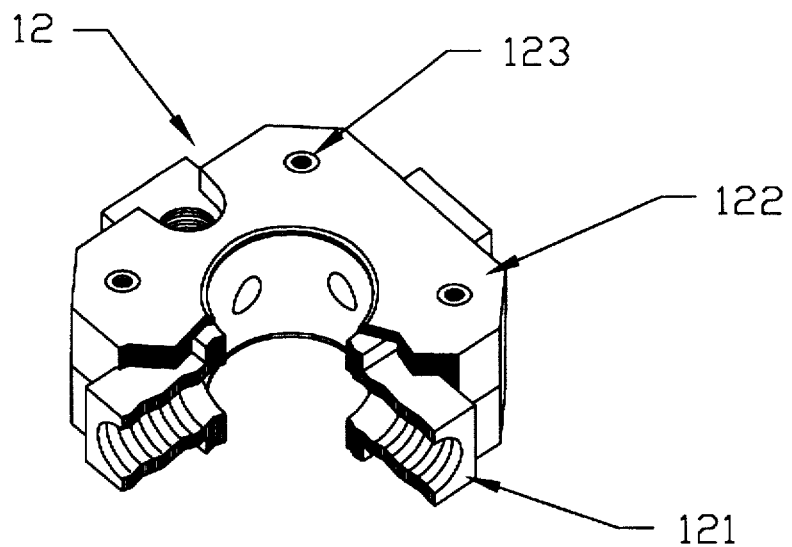
FIG. 4B is a partially broken view of the valve housing assembly.
Figure 4A:
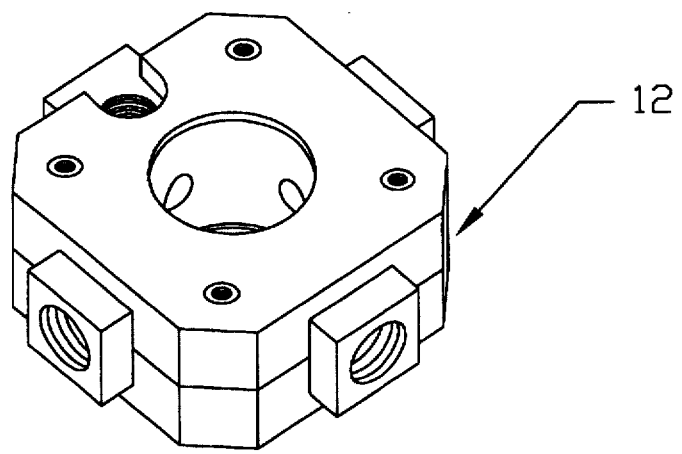
FIG. 4A is a 3-D view of the valve housing assembly.

Referring next to FIGS. 4A and 4B, the housing assembly 12 comprises a valve core housing 121, a housing jacket 122 comprising upper an lower halves, and a plurality of core spacers 123. The core housing 121 and the core spacers 123 can be made from steel as in typical standard temperature valves. The core spacers have a threaded interior to accommodate fasteners that bind the unit together.

The housing jacket 122 must be formed from a refractory material. The housing jacket 122 surrounds and insulates the valve core housing 121. In practice, the housing assembly will be assembled into a unit by positioning the valve core housing 121 and the core spacers 123 in position between the top and bottom halves of the housing jacket 122. An adhesive comprising a refractory material is used to temporarily secure the assembly.

The refractory material of the valve core 141 is critical to the operation of the valve 10. With the valve core assembly 14 constructed as it is, the refractory material is the only moving part that will come into contact with the hot air. This is the element of the construction that allows the valve to function at high temperatures without unnecessarily cooling the hot process air. By shielding the moving components of the valve with the refractory material, the valve can withstand the high temperature required for the hot air supply, 1,000° F., while retaining the mechanical operating characteristics of a metal valve.

Figure 5:
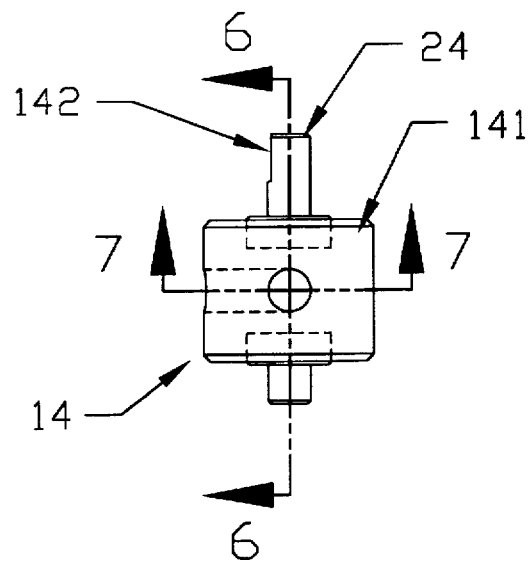
FIG. 5 is a front view of the valve core assembly.
Figure 7:
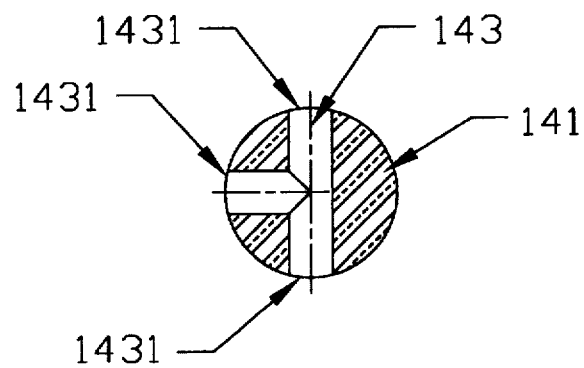
FIG. 7 is a cross section view taken along line 7—7 of FIG. 5.
Figure 6:
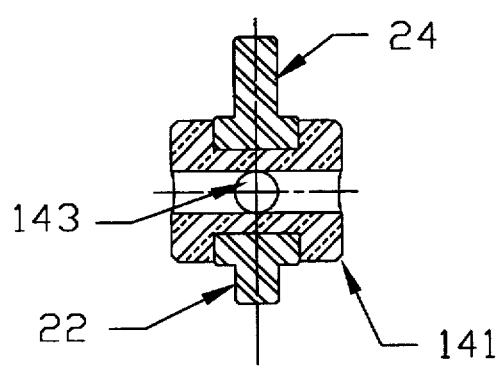
FIG. 6 is a cross section view taken along line 6—6 of FIG. 5.

FIGS. 5–7 illustrate the various components of the valve core assembly 14. A valve core 141 is formed from a refractory material. The valve core 141 includes in an upper surface a rotation shaft 24, and in a lower surface, a pivot shaft 22. The shafts 22, 24 are inserted into openings in the valve core 141. The bases of the shafts 22, 24 are polygonal in shape so that they do not rotate independently within the valve core 141. The valve core 141 is manufactured through molding and subsequent grinding processes.

As an alternative construction, the valve core assembly 14 can be manufactured as an integral unit. In this construction, the valve core 141, the pivot shaft 22, and the rotation shaft 24 would be formed as a single piece.

A three-pronged airway 143 passes through an interior portion of the valve core 141. The airway 143, again due to the molding process utilized, is completely surrounded and shielded by the refractory material of the valve core 141. The mode of operation defines which of the three ports 1431 of the airway 143 will be utilized as an inlet, and which will be utilized as an outlet. (See explanation of installation below.)

The rotation shaft 24 extends from the upper surface of the valve core 141. An actuator receiving means 142 situated on the rotation shaft 24 is adapted to receive either manual or automatic actuating means.

After the valve core assembly 14 is inserted into the housing assembly 12, the upper and lower bushings 20 are placed over the rotation and actuation shafts 24 & 22 so that they register against the inner wall of the housing assembly 12 so as to center the core assembly 14. The upper and lower mount plates 16 & 18 are positioned over the bushings 20. Fasteners are then inserted through the upper and lower mount plates 16 & 18 into the core spacers 123 to permanently secure the valve core housing 121 and the housing jacket 122 together to form the housing assembly 12.

The installation of the valve in a process will depend upon the needs of the user. Referring now to FIG. 1, inlet 101 is connected to the hot air supply. Outlet 103 is the hot air source for the user's process. Outlet 102 or 104 will be the outlet for diverted waste air during a process pause. The outlet not chosen for divert flow is capped.

It should be recognized that the valve could easily be constructed with only three outlets in the housing assembly. The inclusion of the fourth outlet is simply to increase versatility of the device by making both "left-hand" and "right-hand" installations possible with a single valve.

Operation of the valve 10 begins with the airway 143 aligned so that inlet 101 and outlet 103 are in the path of the hot air flow. The longer portion of the airway 143, that which passes through the diameter of the valve core assembly 14 (see FIG. 7), is aligned with inlet 101 and outlet 103. The outlet 102 or 104 aligned with the shorter branch of the airway 143 in operation mode is capped by the installer of the valve 10 so that air supply is not lost during the process mode.

When the user desires to temporarily pause the process, he triggers an actuator means affixed to the actuator receiving means 142 on the rotation shaft 24. The actuator rotates the core 14 ninety degrees. (The rotation may be either clockwise or counterclockwise, depending on the installation.) The short branch of the airway 143 is thus aligned with the inlet 101. Air flows into inlet 101, and out outlet 102 or 104 to the waste air area in the pause mode.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A hot air divert valve comprising:

an inlet to receive a hot air supply line, at least a first and a second outlet, a housing assembly, said housing assembly comprises a valve core housing, a refractory housing jacket, and a plurality of core spacers, and a valve core assembly comprising a refractory valve core, a rotation shaft, and a pivot shaft, said valve core assembly further includes a three-pronged airway therein, said airway includes a first branch and a second branch; wherein said valve core assembly is rotatably secured in said housing assembly, at least one bushing is installed on at least one shaft of said valve core assembly to facilitate rotation of said valve core assembly within said housing assembly, said bushing being formed from a refractory material so as to insulate said valve core assembly from external surfaces of said valve, said housing jacket surrounds and insulates said valve core housing, isolating a valve core actuator from said hot air supply and reducing ambient cooling of air in said hot air supply line; such that when said divert valve is in a process mode, a first end of said first branch of said airway is aligned with said inlet so that said hot air supply flows through said first branch and out of said first outlet to a subject workpiece, a second end of said first branch of said airway being aligned with said first outlet, and when said divert valve is in a pause mode, said second branch of said airway is aligned with said inlet so that said hot air supply flows through said second branch and out of said second outlet to a waste air area, away from said subject workpiece, said first end of said first branch being aligned with said second outlet.

2. The hot air divert valve of claim 1 wherein:

said rotation shaft and said pivot shaft each includes one of said bushings installed thereon.

3. The hot air divert valve of claim 1 wherein:

said valve core assembly and said housing assembly are contained between an upper mount plate and a lower mount plate.

4. A hot air divert valve comprising:

an inlet to receive a hot air supply line, at least a first and a second outlet, a housing assembly, said housing assembly comprises a valve core housing, a refractory housing jacket, and a plurality of core spacers, and a valve core comprising a refractory valve core, a rotation shaft, and a pivot shaft, said valve core is formed as an integral unit, said valve core further includes a three-pronged airway therein, said airway includes a first branch and a second branch; wherein said valve core is rotatably secured in said housing assembly, at least one bushing is installed on at least one extending shaft of said valve core to facilitate rotation of said valve core within said housing assembly, said bushing being formed from a refractory material so as to insulate said valve core from said hot air supply, said housing jacket surrounds and insulates said valve core housing, protecting said valve core housing from said hot air supply so that a temperature of said valve core housing does not exceed a temperature at which steel parts are able to operate as moving parts when said hot air line flows through said hot air divert valve; such that when said divert valve is in a process mode, a first end of said first branch of said airway is aligned with said inlet so that said hot air supply flows through said first branch and out of said first outlet to a subject workpiece, a second end of said first branch of said airway being aligned with said first outlet, and when said divert valve is in a pause mode, said second branch of said airway is aligned with said inlet so that said hot air supply flows through said second branch and out of said second outlet to a waste air area, away from said subject workpiece, said first end of said first branch being aligned with said second outlet.

5. The hot air divert valve of claim 1 wherein:
said rotation shaft and said pivot shaft each includes one of said bushings installed thereon.

6. The hot air divert valve of claim 1 wherein:
said valve core and said housing assembly are contained between an upper mount plate and a lower mount plate.

* * * * *